United States Patent
Xiao et al.

(10) Patent No.: US 11,841,844 B2
(45) Date of Patent: Dec. 12, 2023

(54) INDEX UPDATE PIPELINE

(71) Applicant: Amazon Technologies, Inc., Reno, NV (US)

(72) Inventors: Wei Xiao, Kirkland, WA (US); Clarence Wing Yin Ng, Daly City, CA (US); Medhavi Dhawan, Cupertino, CA (US); Timothy Andrew Rath, Seattle, WA (US); Stefano Stefani, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/898,151

(22) Filed: May 20, 2013

(65) Prior Publication Data

US 2014/0344236 A1  Nov. 20, 2014

(51) Int. Cl.
*G06F 16/23* (2019.01)

(52) U.S. Cl.
CPC .................. *G06F 16/2358* (2019.01)

(58) Field of Classification Search
CPC ........... G06F 17/30575; G06F 11/2097; G06F 17/30557; G06F 11/1469; G06F 11/201; G06F 11/2069; G06F 11/2082; G06F 17/30174; G06F 17/30215; G06F 17/30578
USPC .................. 707/696, 781, E17.032
See application file for complete search history.

(56) References Cited

U.S. PATENT DOCUMENTS

| | | | |
|---|---|---|---|
| 6,785,696 B2 | 8/2004 | Mosher et al. | |
| 7,558,883 B1 | 7/2009 | Lamport | |
| 7,685,109 B1 * | 3/2010 | Ransil | G06F 16/27 707/999.003 |
| 8,046,327 B2 | 10/2011 | Brodersen et al. | |
| 8,090,710 B2 | 1/2012 | Barsness et al. | |

(Continued)

FOREIGN PATENT DOCUMENTS

| | | |
|---|---|---|
| CN | 101089857 A | 12/2007 |
| CN | 103077222 A | 5/2013 |

(Continued)

OTHER PUBLICATIONS

International Patent Application No. PCT/US2014/038640; Int'l Search Report and The Written Opinion; dated Oct. 7, 2014; 16 pages.

(Continued)

*Primary Examiner* — Kris E Mackes
*Assistant Examiner* — Soheila (Gina) Davanlou
(74) *Attorney, Agent, or Firm* — Davis Wright Tremaine LLP

(57) ABSTRACT

Distributed database management systems may maintain collections of items spanning multiple partitions. Index structures may correspond to items on one partition or to items on multiple partitions. Item collections and indexes may be replicated. Changes to the data maintained by the distributed database management system may result in updates to multiple index structures. The changes may be compiled into an instruction set applicable to the index structures. In-memory buffers may contain the instructions prior to transmission to affected partitions. Replication logs may be combined with an acknowledgment mechanism for reliable transmission of the instructions to the affected partitions.

26 Claims, 13 Drawing Sheets

(56) References Cited

U.S. PATENT DOCUMENTS

| | | | |
|---|---|---|---|
| 8,380,702 B2* | 2/2013 | Baby | G06F 16/81 707/715 |
| 8,386,540 B1 | 2/2013 | McAlister et al. | |
| 8,417,679 B1* | 4/2013 | Lyle | G06F 16/13 707/696 |
| 8,601,000 B1* | 12/2013 | Stefani | G06F 16/278 707/747 |
| 8,612,706 B1* | 12/2013 | Madril | G06F 3/0676 711/162 |
| 8,650,155 B2 | 2/2014 | Corbin et al. | |
| 8,666,939 B2 | 3/2014 | O'Krafka et al. | |
| 8,667,001 B2 | 3/2014 | Dinker et al. | |
| 9,430,343 B1* | 8/2016 | Trachtman | G06F 11/1662 |
| 9,489,434 B1 | 11/2016 | Rath | |
| 2002/0184239 A1* | 12/2002 | Mosher, Jr. | H04N 1/00209 |
| 2003/0101183 A1 | 5/2003 | Kabra et al. | |
| 2005/0138081 A1* | 6/2005 | Alshab | G06Q 10/06 |
| 2006/0015490 A1* | 1/2006 | Denuit et al. | 707/4 |
| 2006/0179147 A1* | 8/2006 | Tran | G06F 11/2012 709/227 |
| 2007/0162462 A1* | 7/2007 | Zhang | G06F 17/30067 |
| 2007/0220067 A1* | 9/2007 | Suriyanarayanan et al. | 707/203 |
| 2007/0282915 A1* | 12/2007 | Vosshall et al. | 707/200 |
| 2007/0286097 A1 | 12/2007 | Davies | |
| 2008/0052784 A1* | 2/2008 | Wiley et al. | 726/28 |
| 2008/0104022 A1* | 5/2008 | Ronca | G06Q 40/00 |
| 2009/0019093 A1 | 1/2009 | Brodersen et al. | |
| 2009/0157776 A1 | 6/2009 | McGarvey | |
| 2009/0210429 A1* | 8/2009 | Agrawal | G06F 16/273 |
| 2009/0217274 A1* | 8/2009 | Corbin | G06F 9/466 718/101 |
| 2009/0240664 A1* | 9/2009 | Dinker | G06F 12/0842 |
| 2009/0265306 A1* | 10/2009 | Barsness | G06F 17/30312 |
| 2010/0036894 A1 | 2/2010 | Senda et al. | |
| 2010/0082630 A1* | 4/2010 | Zagelow | G06F 16/2272 707/741 |
| 2010/0191713 A1* | 7/2010 | Lomet | G06F 11/1471 707/704 |
| 2011/0313973 A1 | 12/2011 | Srivas et al. | |
| 2011/0320403 A1 | 12/2011 | O'Krafka et al. | |
| 2012/0005154 A1 | 1/2012 | George et al. | |
| 2012/0016881 A1* | 1/2012 | Hrle | G06F 17/30312 707/746 |
| 2012/0259889 A1 | 10/2012 | Dinker et al. | |
| 2013/0151535 A1* | 6/2013 | Dusberger | G06F 17/30336 707/747 |
| 2013/0159283 A1 | 6/2013 | Broll et al. | |
| 2013/0238628 A1 | 9/2013 | Behnen et al. | |
| 2013/0290249 A1 | 10/2013 | Merriman et al. | |
| 2013/0290375 A1 | 10/2013 | Anderson et al. | |
| 2013/0311488 A1 | 11/2013 | Erdogan et al. | |
| 2013/0332484 A1 | 12/2013 | Gajic | |
| 2014/0136802 A1* | 5/2014 | Becker-Szendy | G06F 12/16 711/162 |
| 2014/0282613 A1 | 9/2014 | Jea et al. | |

FOREIGN PATENT DOCUMENTS

| | | |
|---|---|---|
| EP | 1498815 A2 | 1/2005 |
| JP | H11-327982 A | 11/1999 |
| JP | 2001043119 A | 2/2001 |
| JP | 2007164523 A | 6/2007 |
| JP | 2010-039746 A | 2/2010 |
| WO | WO 2012/162176 A2 | 11/2012 |

OTHER PUBLICATIONS

Chinese First Office Action dated Mar. 28, 2018, Patent Application No. 201480035906.5, filed May 19, 2014, 13 pages.
European Communication pursuant to Article 94(3) EPC dated Jul. 27, 2018, Patent Application No. 14800362.7, filed May 19, 2014, 7 pages.
Japanese Decision of Refusal dated Jul. 2, 2018, Patent Application No. 2016-514993, filed May 19, 2014, 2 pages.
Chinese Second Office Action dated Jan. 30, 2019, Patent Application No. 201480035906.5, filed May 19, 2014, 11 pages.
Japanese Office Action dated Sep. 2, 2019, Patent Application No. 2018-207253, filed May 19, 2014, 7 pages.
Chinese Rejection Decision dated Jul. 26, 2019, Patent Application No. 201480035906.5, filed May 19, 2014, 8 pages.
Chinese Notice of Allowance dated Feb. 3, 2020, Patent Application No. 201480035906.5, filed May 19, 2014, 4 pages.
Indian First Examination Report dated Feb. 18, 2020, Patent Application No. 11501/DELNP/2015, filed May 19, 2014, 6 pages.
Japanese Decision of Refusal dated May 7, 2020, Patent Application No. 2018-207253, 11 pages.
Japanese Notice of Reasons for Refusal dated Mar. 22, 2021, Patent Application No. 2018-207253, 24 pages.
Japan Patent Office, "Notice of Reasons for Refusal" in application No. 2020-150062, dated Oct. 6, 2022, 5 pages.
Japanese Office Action dated Dec. 6, 2021, Patent Application No. 2020-150062, 3 pages.
Japanese Trial/Appeal Decision mailed Dec. 30, 2021, Patent Application No. 2018-207253, 63 pages.
European Patent Application No. 14800362.7; Extended Search Report; dated Jan. 19, 2017; 10 pages.

* cited by examiner

PID Column
752

LSN Column
754

| PID | LSN |
|-----|-----|
| SP1 | 12  |
| SP2 | 5   | row (corresponding to most recent executed instruction from first partition)
756 row (corresponding to most recent executed instruction from second partition)
758 table
750

FIG. 7B

INDEX UPDATE PIPELINE

BACKGROUND

A distributed database management system ("DBMS") may allow for the storage and retrieval of data that is distributed among multiple computing nodes. Data in a distributed DBMS may be organized into tables, which in turn may comprise collections of items sometimes described as partitions. To improve the performance, reliability and availability of the system, each partition may each be housed on a separate computing node that processes requests to store and retrieve the items it houses. A distributed database may also employ replication to maintain standby partitions that may be employed in the event of a system failure.

Indexes may be described as data structures that allow items stored in a distributed DBMS to be located. They may, for example, allow items falling within a particular range of data to be located by scanning the index rather than searching through all of the items stored on one or more of the partitions. A distributed DBMS may contain local and global indexes. A local index can be described as an index that refers to items stored on a single partition. The term global indexes may be used to describe an index that refers to all of the data maintained by a table. Because of replication, a distributed DBMS may contain multiple versions of each local and global index. A number of these indexes may be updated when data maintained by a distributed DBMS is added, deleted or changed.

BRIEF DESCRIPTION OF DRAWINGS

The drawings provided herein are designed to illustrate example embodiments and are not intended to limit the scope of the disclosure.

FIG. 7B is a diagram depicting an embodiment of a data structure for recording the last instructions executed by a partition.

DETAILED DESCRIPTION

Figure 1A:
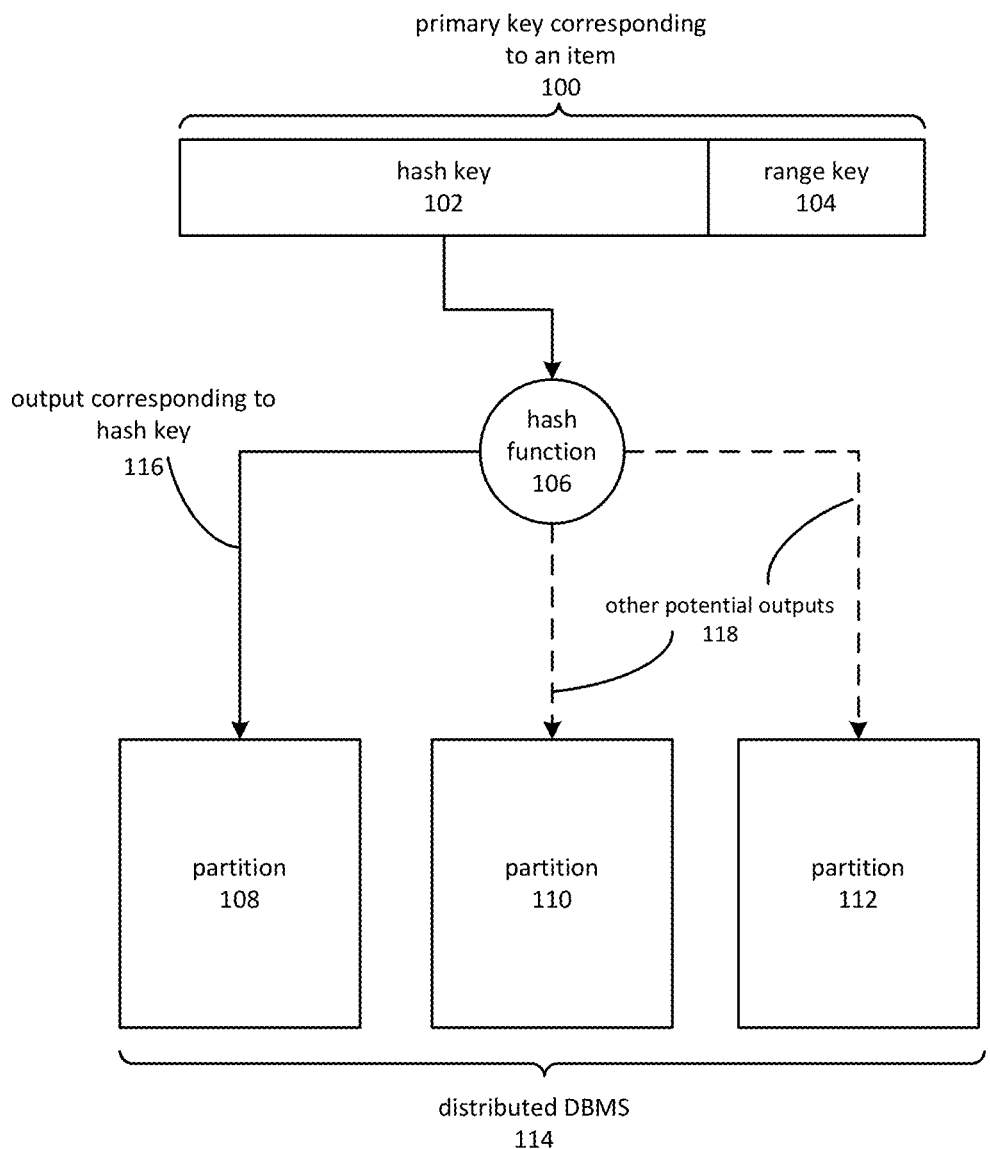
FIG. 1A is a block diagram depicting an embodiment of a distributed DBMS employing a hash and range key function to access data partitions corresponding to computing nodes.

A distributed DBMS may maintain data organized by tables, each of which contains a collection of items. The items may each comprise a set of name value pairs, a set of values identified by column names or undefined values. In various embodiments, individual items may not conform to any particular schema, and each item may accordingly contain a different number of values—each of which may have a different logical meaning and type. Values that have the same logical meaning and type, such as those identified by the same name or column, may for convenience be referred to as columns. Other embodiments of a DBMS may enforce particular structural requirements, such as row and column format, uniqueness constraints, primary and foreign key relationships and the like. Examples of distributed DBMSs include key-value databases, relational databases, non-structured query language ("NoSQL") databases, object-oriented databases and so forth.

The items in a table may be identified by primary key values. Each primary key value, taken as a whole, uniquely identifies an item stored in the table. To access an item, a client of the distributed DBMS may issue a request that includes a primary key value that corresponds to that item. Embodiments may also support access using secondary keys, which may not necessarily correspond to precisely one item in a table.

Primary keys may be defined when the table is created. A description of a primary key may be stored with other aspects of the table's schema, which may include any required columns, constraints on values and so forth. For the primary key, schema may include a description of the length and value of a primary key. For example, a primary key might be defined as a 256-bit binary value or as a variable-length string of characters.

The primary key may also be defined as having an internal structure. Although in some embodiments a primary key's structure may consist only of a single value, embodiments may support or require that the primary key comprise a composite of two or more values. For example, the primary key may be divided into two portions, a hash key and range key. Together, these portions of the primary key may reflect or define hierarchical relationships within a collection of items. A hash key may identify a group of items within the hierarchy while a range key identifies specific items within the group.

Primary keys may also be used in a distributed DBMS in conjunction with partitioning. In order to support large volumes of data and high workload demands, distributed DBMSs may support partitioning the data in a table over a number of computing nodes. Various forms of partitioning may be supported. In horizontal partitioning, each computing node may maintain a subset of the collection of items. In vertical partitioning, data may be divided based on columns or fields, so that each computing node may contain a subset of the columns defined on the table. Some distributed DBMSs may combine these two forms of partitioning.

As used herein, the terms horizontal and vertical partitioning refers to a division of a dataset consistent with the preceding paragraph. Embodiments may host each horizontal or vertical partition on a separate computing node. The term partition, as used herein, generally refers to a horizontal or vertical partition hosted on a computing node, although the term may also include a table with only a single partition. The terms fan-out partition, non-voting member and replication partner, as used herein, refer to subcategories of partitions.

One method of horizontal partitioning involves applying methods of distributing data between various computing nodes in a random or semi-random fashion. FIG. 1A depicts one such method. Primary key 100 comprises hash-key component 102 and range-key component 104. Random or semi-random distribution of data across partitions 108, 110 and 112 may improve performance of distributed DBMS 114. Accordingly, an item may be stored on one of partitions 108, 110 and 112 based on application of hash function 106 to hash-key component 102.

Hash function 106 may be computer code that translates a primary-key value to another value, such as an integer, in what may be described as a key space. The hash function 106 may be configured to translate input primary values to a semi-random point in the key space, in which a given input value translates to the same point in the key space on each invocation of the function. A given hash function may map from an input value to a finite set of points, or buckets, within the key space. In various embodiments, hash function 106 may cluster mappings around certain points. For some hash function, this may occur when input values are similar. The skewing may degrade performance because it may result in an uneven distribution of items on a particular computing node. One approach to preventing this problem is to use a hash function that maps to a large number of discrete points within the key space. Regions of key space can then be assigned to computing nodes. Alternatively, regions of key space can be assigned to an intermediate data structure that refers to a computing node. Different regions may be mapped to the same computing node or intermediate data structure.

Returning to FIG. 1A, hash key 102 of primary key 100 may be supplied as an input value to hash function 106. For a given value of hash key 102, application of hash function 106 produces output corresponding to hash key 116. The output of hash function 106 is constant for a given input value. Application of other values to hash function 106 may produce other potential outputs 118, but the results for any given input value are consistent. The consistent output 116 may be used to determine where to initially store the item that corresponds to primary key 100. In addition, because the output of hash function 106 is consistent for given input values, hash key 102 may be applied to hash function 106 to determine where an item was previously stored.

While a table can be split into multiple horizontal partitions, each horizontal partition may be replicated between computing nodes so that the same item is stored on more than one computing node, or more generally the same horizontal partition may be hosted on more than one computing node. This may improve the availability of the system, because if one of the computing nodes becomes unavailable another computing node having the replicated data may be able to step in and take its place. Replication may improve the scalability of the system by allowing load to be shared among multiple computing nodes Consistency between replicated partitions may be maintained using a technique that involves quorum or consensus between the replicated partitions. Embodiments may require quorum only among currently active computing nodes, which may improve availability because it does not require all of the computing nodes to be online.

In some embodiments, quorum may involve determining that a minimum number of computing nodes participate in a read or write operation. For read operations, at least the minimum number of computing nodes must respond to a request to read an item. Because data is not necessarily replicated immediately, it may be the case that two given computing nodes will have different values for the same item. If so, some embodiments may return each version of the data, along with information descriptive of the version. For write operations, quorum may involve the minimum number of computing nodes acknowledging the success of a write operation. For example, if three computing nodes share replicated data, a write operation might be required of two of the three computing nodes. Embodiments may impose different quorum requirements based on the type of operation involved. For example, write operations may involve a higher threshold number of computing nodes in order to achieve quorum.

Figure 1B:
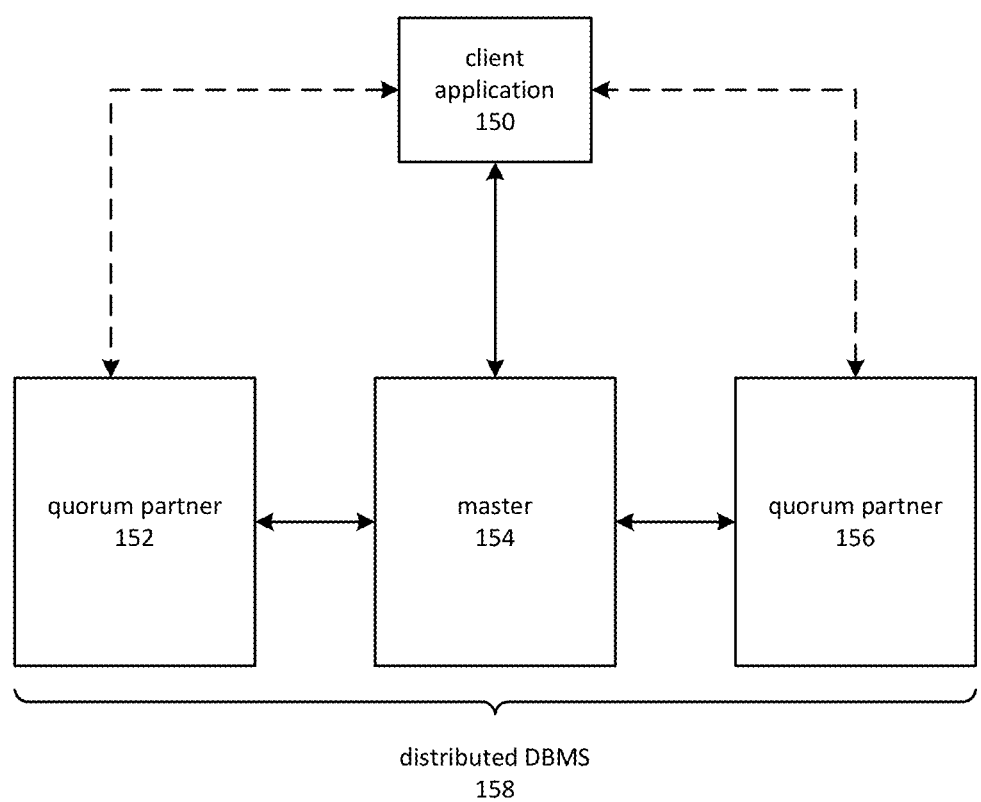
FIG. 1B is a block diagram depicting an embodiment of a distributed DBMS in which operations are performed on a set of partitions participating in quorum-based transactions.

FIG. 1B depicts an embodiment of a distributed DBMS 158 as comprised of a master 154 and quorum partners 152 and 156. Each of these may be hosted on a separate computing node and may also be located within a separate data center. A client application 150 may issue requests to perform various operations on the master partition, such as reading or writing data. Some embodiments may use the same master for all operations, while other embodiments may allow any of the computing nodes to serve as the master. Upon receipt of the request, master 154 secures the involvement of quorum partners 152 and 156. The number of quorum partners to be involved may depend on the number required for quorum. Alternatively, master 154 may determine quorum to be present based on involvement of a majority of quorum partners that are currently operational. Once the request has been successfully processed on a sufficient number of computing nodes, as required for quorum, the results of the operation may be returned to client application 150.

A distributed database may support a wide variety of operations. Non-limiting examples include put operations, which involve storing or updating items, and read operations, which involve retrieving values corresponding to an item. Both operations may supply primary key values for use by the distributed DBMS in identifying the item. Another example of an operation that may be supported by some embodiments is a range query. A range query involves returning a span of items conforming to some set of fixed criteria. For example, a distributed DBMS might contain a table of items containing address information, from which a client wishes to retrieve all items corresponding to a particular zip code. In a distributed DBMS that employs a hash function to randomly distribute data using the leading portion of a primary key, range queries may not be efficient if the leading portion of the primary key is fixed.

Various operations on data may be made more efficient through the use of index structures in addition to a primary index. In a key-value database, a secondary index comprises one or more data structures that are addressable by a potentially non-unique key value. Unlike primary key values, secondary key values are not necessarily unique. In other words, a single secondary key value may refer to one or more entries in a secondary index.

For a given item, a secondary index key may comprise one or more of the values that make up the item. In various embodiments, the secondary index might also contain a mapping from its entries, which are accessible by secondary key values, to the storage location of the item. However, in some embodiments this mapping might be omitted. The secondary index entries might contain a copy of the primary key value, or a direct reference to the primary index, that may be used to retrieve a full item from an item store. An item store, which may also be referred to as a base table, comprises a collection of items maintained on a storage device. The items stored in an item store may comprise all of the values, or name value pairs, associated with the item. Data in an item store may be horizontally or vertically partitioned, and if so subsets of an item store may reside on more than one computing node.

Figure 2A:
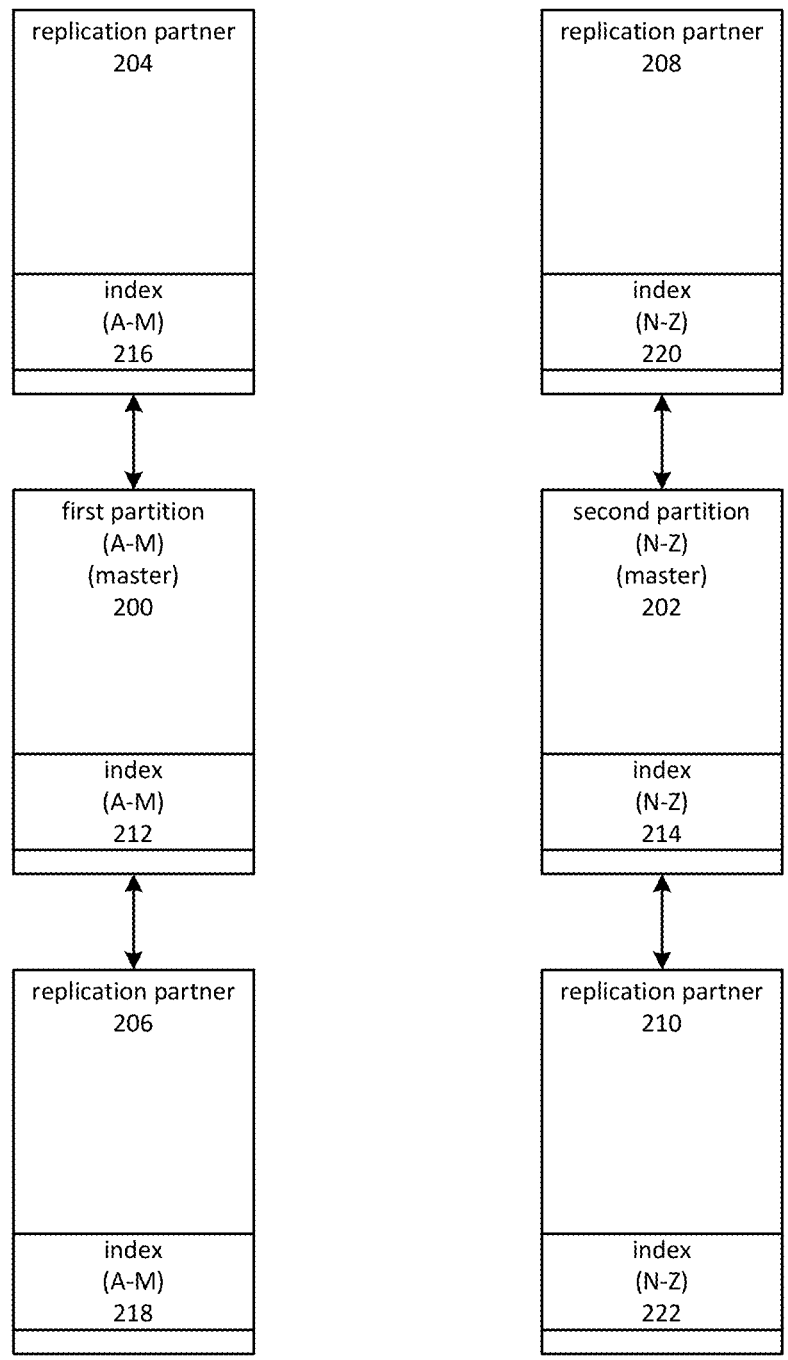
FIG. 2A is a block diagram depicting a partitioned table with associated replication partners and index structures.

Index structures may span more than one partition. FIG. 2A depicts two partitions of a table, the first partition 200 containing data with key values starting with the letters A through M, and the second partition 202 containing N through Z. Each partition may also contain an index of items stored on the partition. Index 212 on first partition 200 contains entries corresponding to A through M, while index 214 on second partition 202 contains entries corresponding to N through Z. Together, index 212 and 214 may be considered to be a global index because together they reference all of the items in the table.

FIG. 2A also depicts first partition 200 being paired with replication partners 204 and 206. Replication partners 204 and 206 may also be quorum members with first partition 200. Similarly, second partition 202 is depicted as being paired with replication partners 208 and 210.

In the depicted example, updates to data on first partition 200 or second partition 202 may impact data and indexes stored on other partitions. As one example, an update to an item stored on first partition 200 might be replicated to replication partners 204 and 206, and similarly would require updates to indexes 216 and 218. As another example, if an item stored on first partition 200 were to be changed so that it should now be stored on second partition 202, partitions 200 and 202, replication partners 204, 206, 208 and 210 and indexes 212, 214, 216, 218, 220 and 222 would be updated to reflect the item being removed from first partition 200 and added to second partition 202.

Figure 2B:
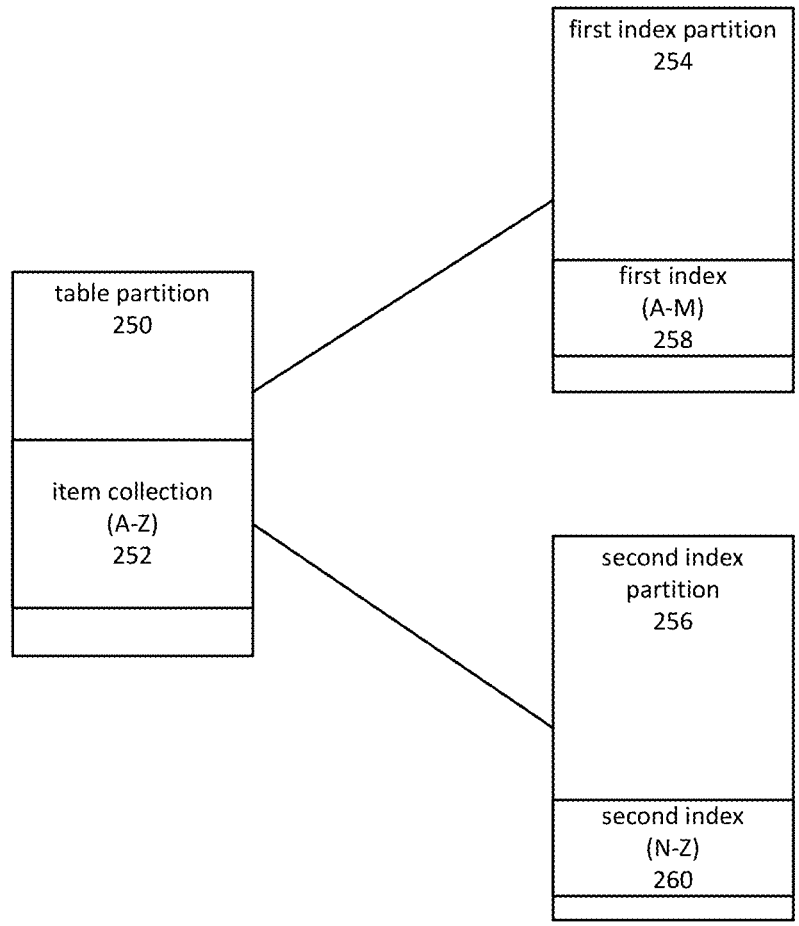
FIG. 2B is a block diagram depicting a table partition with two associated index partitions.

FIG. 2B is an illustrative example depicting an arrangement of a table partition 250 and two index partitions 254 and 256. An index partition may comprise a computing node hosting an index structure, possibly a portion of one (i.e. a partitioned index). In the depicted example, first index partition 254 contains index entries for items stored on table partition 250 falling within the range of A through M, and second index partition 256 contains an index for items in the range N through Z.

An update to an item stored within item collection 252 on table partition 250 may require corresponding changes to first index 258 on index partition 254, as well as to second index 260 on index partition 256. This may occur when a value changes, and that value corresponds to the key used by an index. For example, if such a value changed from N to E, the entries corresponding to it would need to be deleted from first index 258 and added to second index 260.

Figure 3:
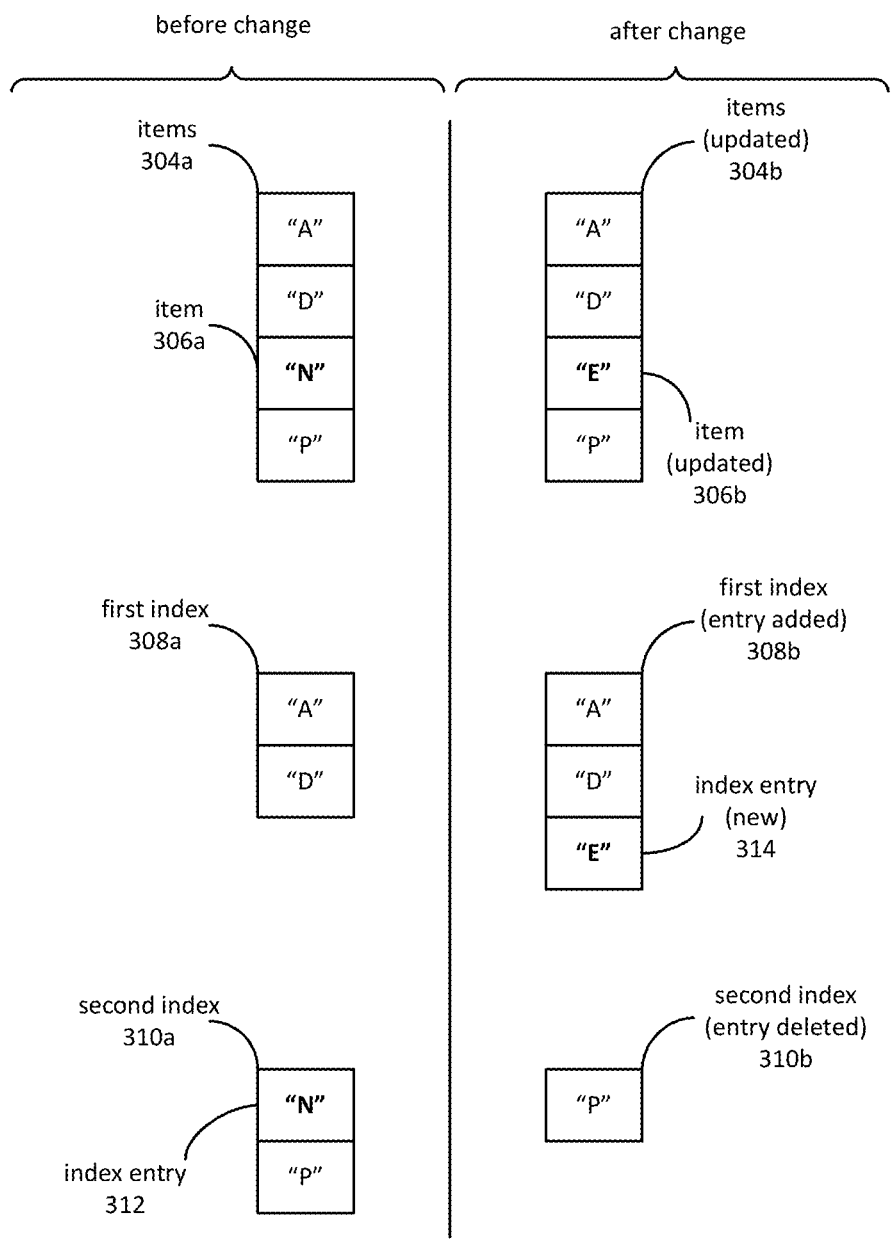
FIG. 3 is a diagram depicting an illustrative example of multiple index updates resulting from a change to an indexed value.

FIG. 3 is an illustrative example depicting multiple index updates resulting from a change to an indexed value. For illustrative purposes, a table is assumed to comprise a first index partition 254 and a second index partition 256 as illustrated in FIG. 2B. FIG. 3, depicts the state of an item collection and associated index before and after a change to one of the item's values. For illustrative purposes, the partitioning scheme depicted in FIG. 2B may be assumed. Accordingly, first index 308a maps key values in the range A through M, while second index 310a maps key values in the range N through Z. Before item 306a is changed, an entry corresponding to its value of N is seen in index entry 312 within second index 310a.

Item 306a, of the set of items 304a, initially has a value of N that is then changed to E, as depicted by item 306b. The changed value is reflected in the updated items 304b. First index 308b is also changed, having a new entry 314 to reflect the new state of item 306b. Similarly, index entry 312 is deleted from second index 310b.

The changes just described may be viewed as comprising a number of discrete actions. First, an item in an item collection containing the value N was updated to reflect a new value of E. Second, a delete operation was performed on an index to remove an entry corresponding to the old N value. Third, an entry was added to an index to reflect the new value of E. In various embodiments disclosed herein, instructions representing changes such as these may be distributed through an update pipeline to various components of a distributed DBMS.

In a distributed DBMS, each partition may have a replication log that describes changes made to that partition. The replication log may describe changes made to the data stored on that partition, such as addition, deletion or modification of items stored on the partition. Every change added to the replication log may include a log serial number ("LSN"), which increases sequentially, starting at one when the partition is first created. In addition, each partition may be identified by a partition ID ("PID") that identifies the partition. The combination of an LSN and a PID may be used to uniquely identify a change made to a partition.

A distributed DBMS may record entries in a replication log indicating that an item's values have changed. A compact representation of the change might supply a primary key value and any additional values that have changed. Embodiments may also employ a replication log in conjunction with performing updates on global and local secondary indexes. Using FIG. 2A as an example, an update to an item might involve deleting an entry from index 212 and adding an entry to index 214. A replication log from first partition 200 might be shipped to quorum members 204 and 206, and a replication log from second partition 202 might be shipped to quorum members 208 and 210.

Replication partner member 204 may be used as an example to illustrate one method of processing of a replication log. Upon receipt of the replication log, quorum member 204 may process each entry in the log to determine what type of change the entry represents. For each entry, replication partners 204 may apply the change by updating the item in its storage location, determine which index structures should be updated, and then apply those changes.

The replication log obtained from a partition, such as first partition 200 may be shipped to replication partners such as 204 and 206. Embodiments of a distributed DBMS may ship a replication log containing a compact representation of the change. If so, replication partners 204 and 206 may process the update as it would any other update, including performing steps such as determining which index structures need to be updated.

However, embodiments may employ an alternate approach in which replication log entries are extended to include a set of instructions corresponding to operations performed by the master partition while processing the update. This approach may improve performance by allowing the master partition to determine which index structures need to be updated and including that information in the replication log. Again using replication partner 204 as an example, it may receive the replication log from first partition 200. Each entry in the log may contain information describing the sequence of operations that can be performed to update the item in storage as well as any index structures that are affected.

Figure 4:
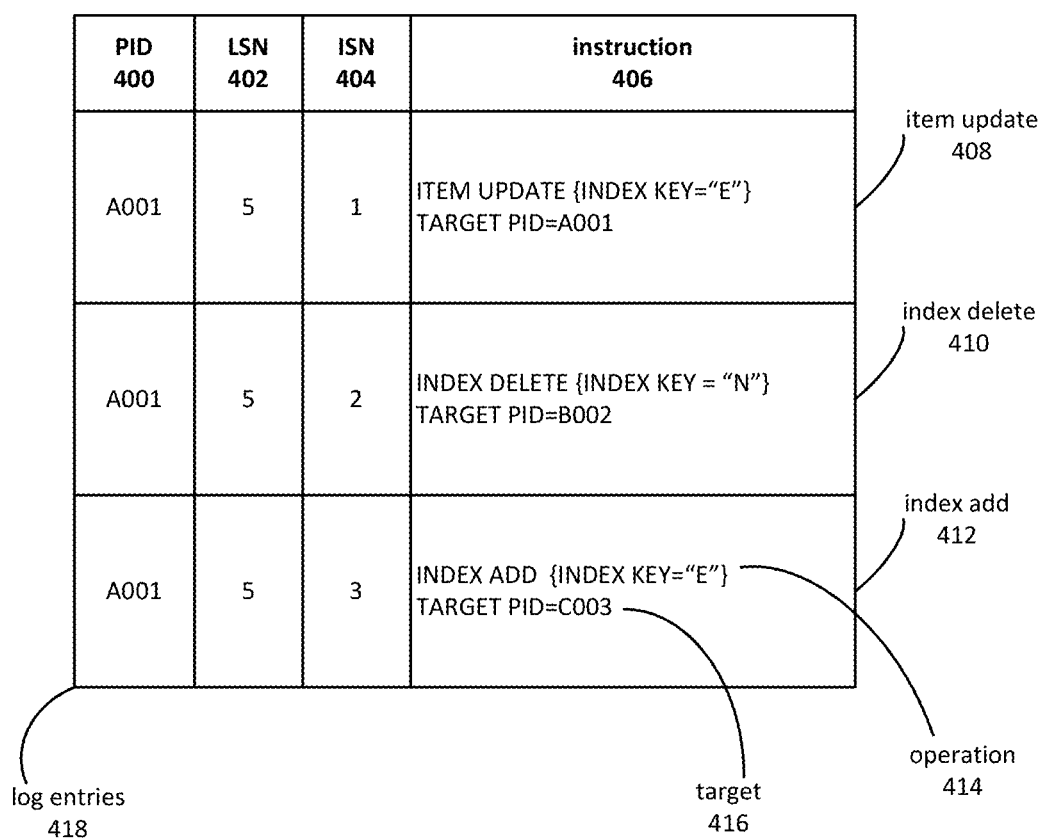
FIG. 4 depicts an embodiment of a replication log containing instructions to update index structures.

FIG. 4 depicts an embodiment of a replication log including instructions to update an index structure. Log entries 418 represent entries in a replication log. One way of describing a replication log is in terms of a table with rows and columns. Log entries 418 comprise PID column 400, log sequence number ("LSN") column 402, ISN column 404 and change description column 406. PID column 400 may indicate the sending partition that is processing the request. A value from this column may be sent to a receiving partition in order to identify the sender.

All of the depicted log entries 418 correspond to a single change, as indicated by the partition id column 400 and log serial number column 402 values, which are equivalent for all of the depicted log entries 418. Three instructions are depicted. Item update 408 represents an update to the item stored on disk to the new value of {INDEX KEY="E"}, where INDEX KEY refers to a value in the item that is also a key used in an index. Additional item values might also be changed, but are not depicted in FIG. 4. Index delete 410 represents an operation to delete an entry corresponding to the out-of-date value {INDEX KEY="N"} from a secondary index. Index add 412 represents an operation to add an entry corresponding to the new value {INDEX KEY="E"} to a secondary index. Embodiments may associate each instruction with an ISN value, such as those depicted in ISN column 404. The ISN value may be used to indicate a sequence in which the instructions should be performed, or may be used to uniquely identify an instruction.

In various embodiments, a partition applying a requested modification may determine that both local and remote data structures need to be changed in order for the update to be completed. Accordingly, log entries 400 may comprise both an operation 414 and a target 416. In FIG. 4, item update 408 might be assumed to target a table partition, i.e. a partition holding item collections but not indexes, and the same partition that processes the instruction. Index delete 410 and index add 412 may each target an index partition, which may be a partition that holds only index data. However, embodiments may involve indexes and item collections hosted on the same partition, different partitions or multiple partitions in various permutations. In an embodiment, the target designation may comprise a partition identifier. Other elements may also be included, such as an identifier of the particular index or other structure being updated.

Because processing a change may result in operations on structures located on more than one partition, embodiments may employ various mechanisms to distribute instructions to other affected partitions. One such mechanism involves send and receive buffers. On a partition, a send buffer may be established for each partition to which instructions may be sent, and a receive buffer may be established for each partition from which instructions may be received.

A variety of instruction types may be included in a replication log, and/or sent to other partitions for processing. Non-limiting examples include various changes to items or indexes such as inserts, updates and deletes. Combined operations may also be indicated, such as a combined index insert and delete. An instruction might also include an indication that the set of operations should be performed as an atomic transaction.

Figure 5:
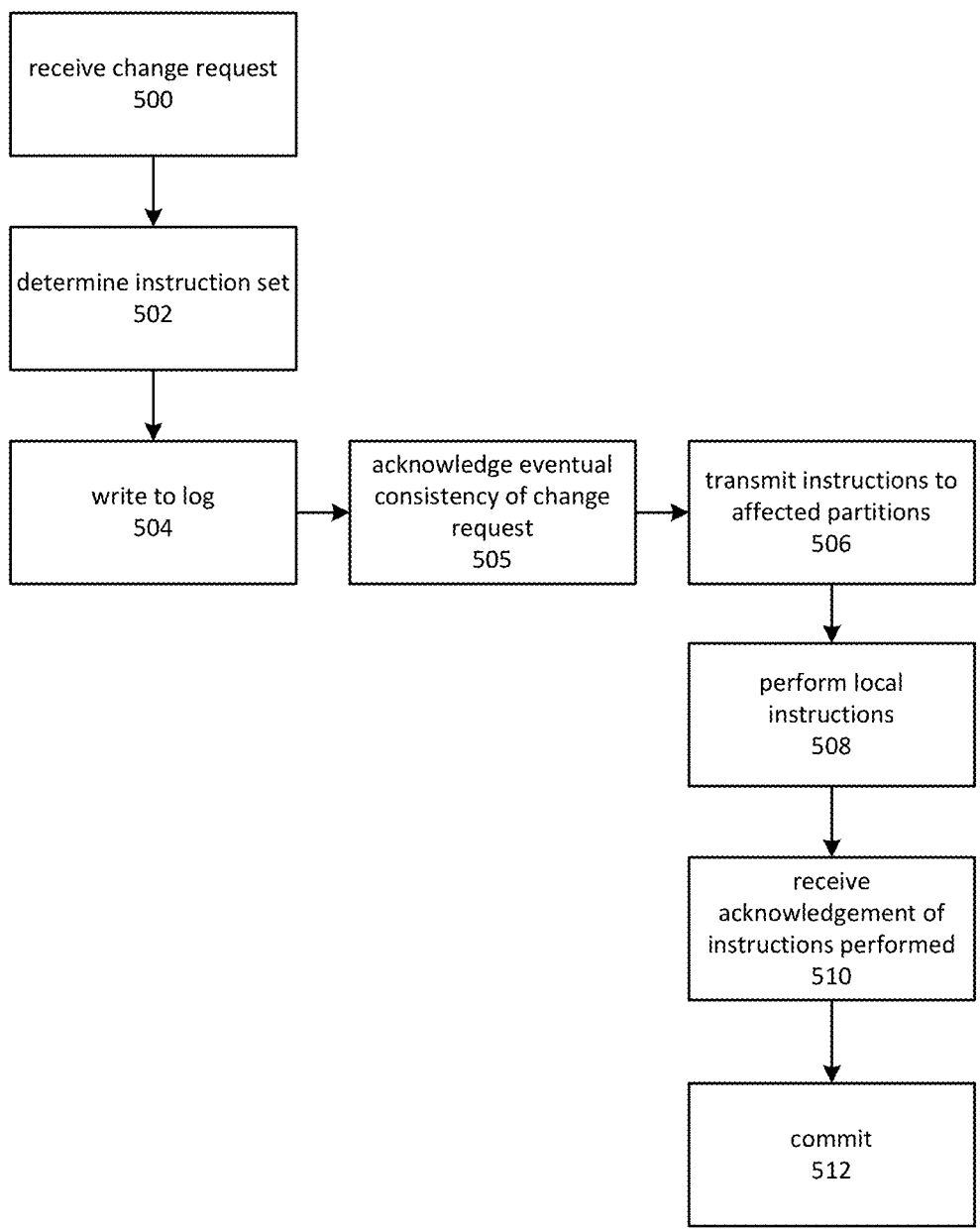
FIG. 5 is a flowchart depicting an embodiment for recording and sending instructions from one partition to one or more affected partitions.

FIG. 5 depicts an embodiment for recording and sending instructions from one partition to one or more affected partitions. Although depicted as a sequence of operations, those of ordinary skill in the art will appreciate that at least some of the depicted operations may be altered, omitted, reordered or performed in parallel.

Operation 500 depicts receiving a change request. A change request may include adding a new item, updating one or more existing values that comprise an item, adding additional values, deleting an item and so forth. The change request may then be analyzed, as depicted by operation 502, to determine what structures will be affected, and to compile a list of instructions to write to a replication log. In some embodiments, the instructions may be performed concurrently with compiling the list, for example by capturing and recording modifications to indexes and other structures as they occur. Other embodiments may analyze the change request prior to modifying indexes and other structures. For example, a query optimizer or other database component might determine a plan of execution for the request, from which the list of instructions might be obtained.

The list of instructions may be written to a replication log file, as depicted by operation 504. Once written, the instructions may be considered durable because they may still be processed subsequent to system failure. The log file may contain indications of which entries have been locally processed and which entries have been successfully sent to other partitions.

Because the instructions may be considered durable, the change request may be acknowledged, to the initiator of the change request, as being eventually consistent, as depicted by operation 505. In other words, a subsequent read operation targeting the changed items or index entries might still return the old values, but will eventually be updated to reflect the new state. Embodiments may permit acknowledgement to be sent, to the initiator of a change request, for various levels of consistency, such as after instructions are written to a log at 504, after local instructions have been performed at 508, when all instructions have been acknowledged at 510 and so forth. The initiator of a change request might indicate what level of consistency is desired, such as eventual or immediate consistency.

Operation 506 depicts transmitting the instructions in the replication log to affected partitions. Embodiments may use a technique that involves writing the instructions to a send buffer, which may hold the instructions until they are sent to affected partitions and receipt of the instructions is acknowledged. A separate send buffer may be used for each destination partition. Embodiments may also employ a single send buffer that includes information that correlates instructions to their corresponding destination partitions.

Some or all of the instructions to be sent to other partitions may be applicable to the partition that received the change request. Operation 508 depicts performing these instructions on the partition that received the change request. In addition, operation 508 may involve performing instructions to change non-local indexes or other structures. For example, in FIG. 2A, first partition 200 might perform instructions that modify an index structure on a remotely located partition or other computing node. Other embodiments may cause non-local instructions to be performed by sending instructions to the partition that is hosting the structure.

Operation 508 may be performed in the order depicted in FIG. 5, or it may be performed at another time in response to the processing of the change request. For example, the operations depicted in FIG. 5 might be performed on a single thread of execution, with the exception of operation 508, which might be performed concurrently on a separate thread of execution. Embodiments may perform the steps depicted as subsequent to 508 or prior to operation 508 being started or completed. When the instructions performed by operation 508 are completed, they may be marked as committed with respect to the partition that received the change request.

At some time subsequent to writing instructions to a send buffer, a partition may receive an acknowledgement, as depicted by operation 510, that the instructions have been received by a partition and may be considered durable on the receiving partition. In some embodiments, the instructions may not have been performed at the time the acknowledgment is received. However, for these embodiments the acknowledgement confirms that the destination partition has accepted responsibility for performing the acknowledged instructions. This may be done, for example, by writing the received instruction to a log file maintained by the destination partition. Other embodiments may delay acknowledgement until the instruction has been processed. The acknowledgement may be contained in a message transmitted to the sending partition, and may comprise an LSN value for the last instruction executed. For embodiments that process instructions in order, this is sufficient to indicate that instructions with lower LSN values have also been executed.

The acknowledgement received by the partition may be an acknowledgement that the instructions have been successfully performed, that the instructions were effectively performed (for example would have been performed but were redundant), or that an error occurred during their processing. As used herein, the terms performed or performing may include any of these conditions. In the error case, embodiments may commit or remove instructions from the log file even if an error condition occurred, because otherwise the instruction that caused the error might be resent repeatedly. Embodiments may update the log with additional information about the type of acknowledgement received, and various reports may be generated to help technical personnel diagnose error conditions and correct data discrepancies. Embodiments may perform steps such as marking instructions in the log file as performed with or without error, or removing instructions from the log file.

Embodiments may also employ techniques to detect instructions in a log file that have remained unacknowledged beyond an expected period. Embodiments may remove such entries from the log file, or mark the entries with status information for later diagnosis or correction of data discrepancies. Techniques that might be employed are various combinations of scanning instructions in the replication log, examining the time the instructions were sent, and tracking regions of the replication log that contain unacknowledged instructions.

At operation 512, the instructions in the log file that correspond to the acknowledged instructions may be marked as committed with respect to their destination partitions. If operation 508 has also been completed, the instructions may be marked as fully committed. Upon recovery from failure and other events such as redesignation of a master, entries in the log file may be replayed. The replay process may resend uncommitted instructions but skip committed instructions.

Some embodiments may mark instructions as committed by updating corresponding entries in the log file. Other embodiments may not update the log file. For example, some embodiments may replay instructions from the log file based on a record of a last executed instruction. Instructions subsequent to the last executed instruction may be considered uncommitted while instructions prior to and including the last executed instruction may be considered to be marked as committed.

Figure 6:
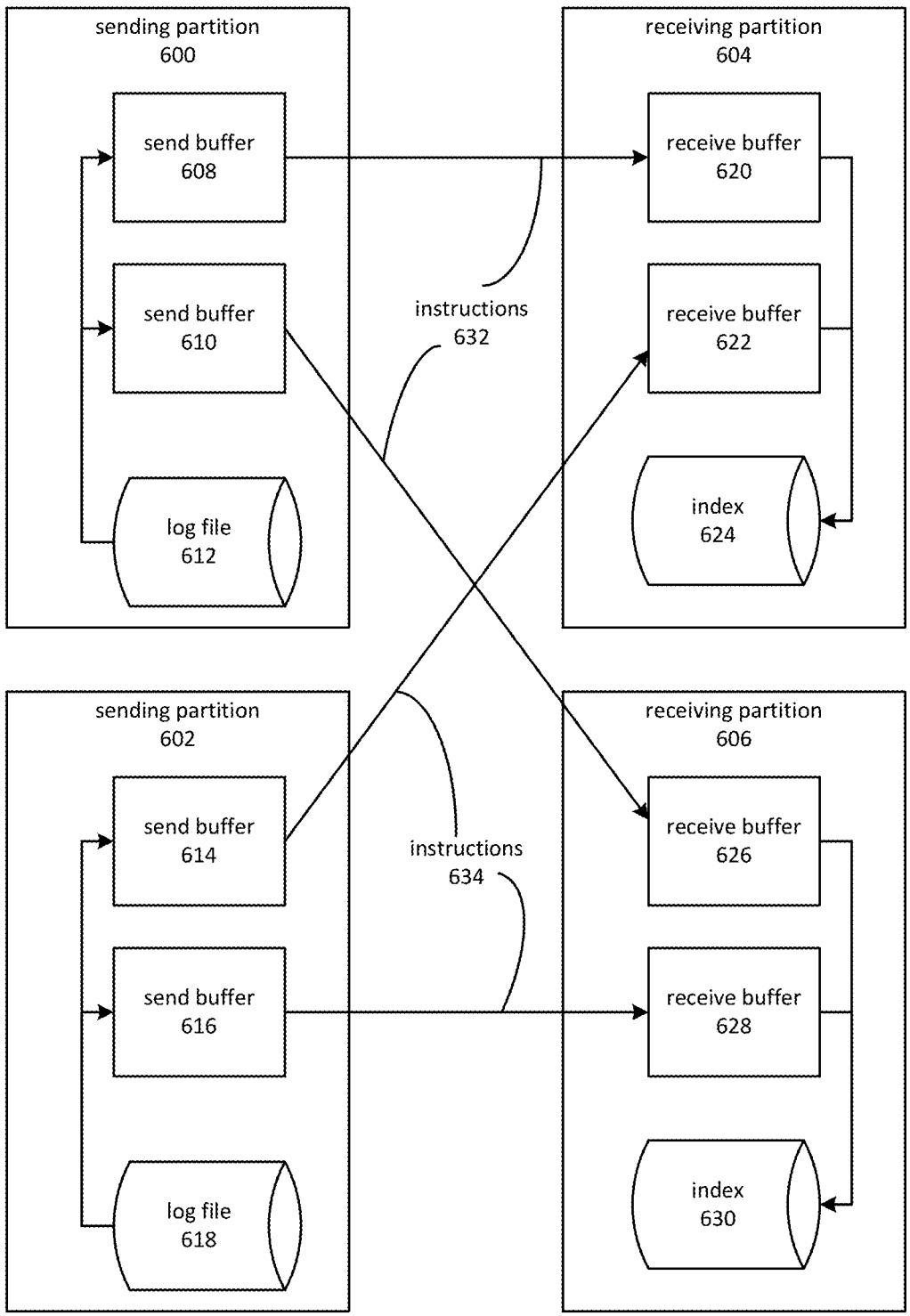
FIG. 6 is a block diagram depicting an embodiment for configuring send and receive buffers for the transmission and execution of instructions on index structures.

FIG. 6 depicts an embodiment for configuring send and receive buffers. Sending partition 600 comprises log file 612 and two send buffers 608 and 610, which may be stored in volatile memory. Sending partition 602, comprising log file 618 and send buffers 614 and 616, is configured similarly to sending partition 600 and operates in a similar manner.

In some embodiments, a partition may utilize one send buffer for every receiving partition. For illustrative purposes, assume that sending partitions 600 and 602 have each received a change request. Further assume that each change request implies transmitting an instruction to each of receiving partition 604 and 606. These assumptions are reflected in FIG. 6 by the arrows marked instructions 632 and 634.

Examining sending partition 600 more closely, upon receipt of the example change request described in the preceding paragraph, the sending partition may cause instructions directed to receiving partitions 604 and 606 to be written to log file 612 and placed in the corresponding in-memory send buffers 608 and 610 for eventual transmission to receiving partitions 604 and 606. The instructions placed in the send-buffer may comprise a description of the instruction to be performed, an indication of the data structure that the instruction applies to, and information such as the LSN, PID of the sending partition and so forth. This information may allow the receiving partition, such as receiving partitions 604 and 606, to identify the source of a request and to determine the order that received instructions should be processed. The information may also be used to send acknowledgments and to track which instructions have already been performed, as described herein in connection with FIG. 7.

It may be the case that the system crashes, after instructions 632 have been written to log file 612 but before they have been successfully sent and processed by receiving partitions 604 and 606. If so, when the system recovers entries in log file 612 may be replayed, so that instructions 632 are again placed in send buffers 608 and 610.

Receiving partition 604 comprises index 624, which may for illustrative purposes be considered to be one of the targets of instructions 632 and 634. Receiving partition 604 may also comprise one receive buffer for each partition from which it may receive instructions. Accordingly, FIG. 6 depicts two receive buffers 620 and 622 corresponding to sending partitions 600 and 602. Receiving partition 606, comprising receive buffers 626 and 628 and index 630, is configured similarly to receiving partition 604 and operates in a similar manner.

Receive buffers 620 and 622 may be held in volatile memory and consequently instructions held in the buffers would be lost in the event of system failure. However, embodiments may recover from system failure by replaying system log entries. Were the system depicted in FIG. 6 to fail, upon recovery log files 612 and 618 could be replayed, so that unacknowledged instructions in log files 612 and 618 would again be sent to receiving partition 604 and stored in receive buffers 620 and 622.

Once placed in receive buffers 620 and 622, the instructions may be executed. Executing the instructions may involve inserting, updating, deleting or otherwise modifying an entry in index 624. Once an instruction has been executed, it may be removed from the receive buffer. Embodiments may execute the instruction and remove it from the receive buffer within the context of an atomic transaction, to help avoid instructions being lost or duplicated.

Figure 7A:
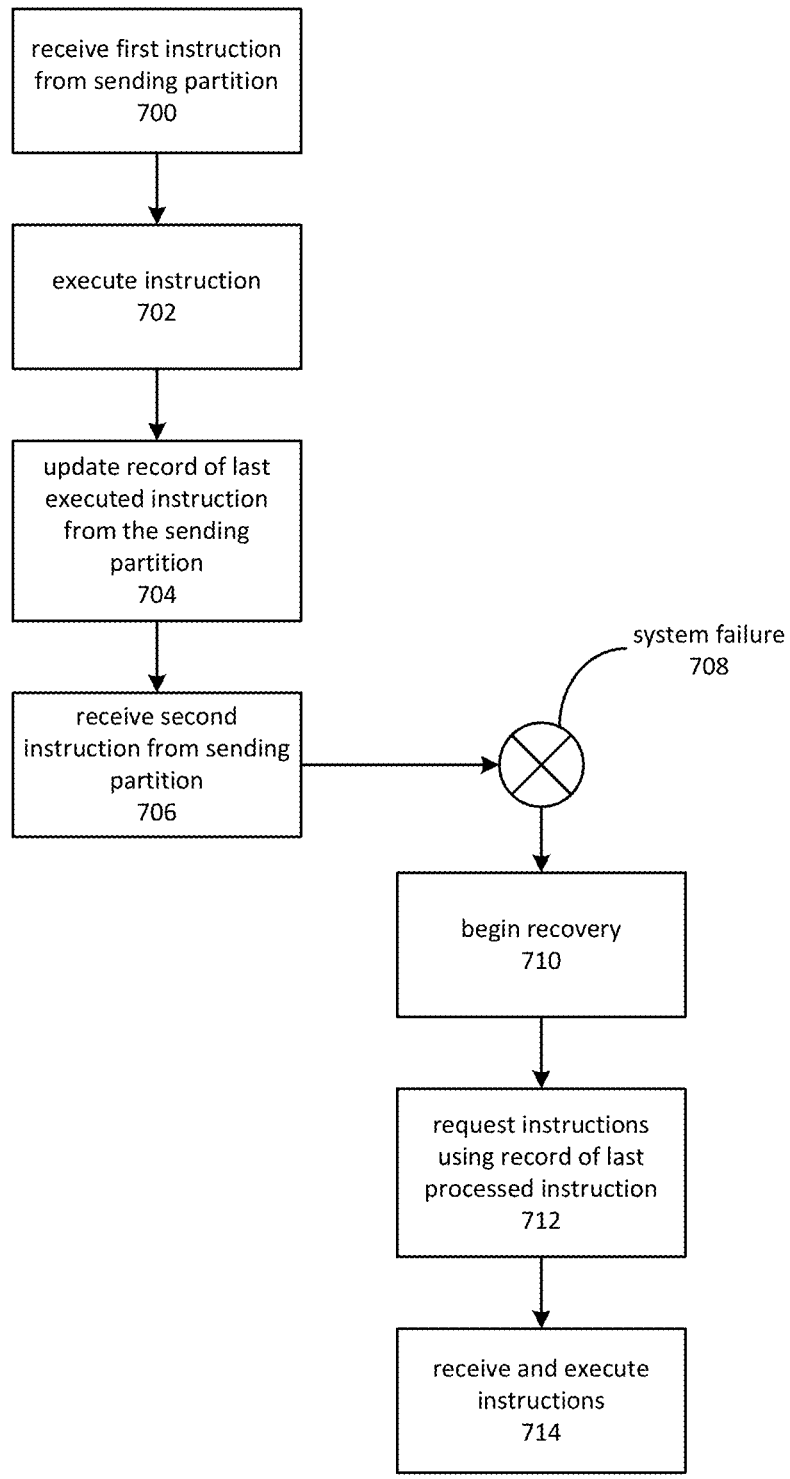
FIG. 7A is a flowchart depicting an embodiment for recovering the contents of a receive buffer following system failure.

FIG. 7A depicts an embodiment of recovering contents of a receive buffer following a system failure. Although depicted as a sequence of operations, those of ordinary skill in the art will appreciate that at least some of the depicted operations may be altered, omitted, reordered or performed in parallel.

At operation 700, a first instruction may be received from the sending partition and placed within a receive buffer. Received instructions may be accompanied by identifying information such as a PID, LSN and so on. Embodiments may also employ globally unique identifiers ("GUIDs") or similar mechanisms.

After receipt, the instruction may be executed as depicted by operation 702. Executing the instruction may comprise performing various modifications to indexes and other data structures on the receiving partition. For example, an instruction may comprise deleting an entry from an index, inserting an entry into an index, updating values in an index, updating item values and so forth. The term instruction, as used herein, may comprise multiple sub-instructions. Embodiments may perform instructions as an atomic set, such that either all of the sub-instructions are fully executed or none are permitted to take effect.

After successful execution of the received instruction, a record reflecting successful processing of the instruction may be updated, as depicted by operation 704. FIG. 7B depicts one non-limiting example of a structure that embodiments may employ for this purpose. A table 750 may consist of PID column 752 and LSN column 754. Embodiments may employ a variety of data structures such as B-trees, arrays and so forth to represent the table. For the embodiment depicted in FIG. 7B, the table should be made durable so that its contents may be recovered in the event of system failure.

A combination of PID and LSN values may uniquely identify an instruction. As explained herein, a PID value may be used to uniquely identify a sending partition, while an LSN value may indicate the sequence of an instruction originating from a sending partition. When combined, the two values uniquely identify an instruction.

The LSN values provided by a sending partition may be sequentially incremented. Embodiments of a sending partition may increment an LSN value independent of the destination partition. As a result, in various embodiments the LSN values generated by a sending partition may increase sequentially but the LSN values seen by a receiving value may increase monotonically, but not necessarily sequentially, for a given PID value.

For an illustrative embodiment comprising two sending partitions, table 750 may contain a row 756 corresponding to the most recent instruction from a first partition that was successfully executed. Some embodiments might update row 756 once the instruction has become durable, rather than requiring the instruction to be fully executed. Row 758 is similar to row 756, but corresponds to the second partition.

Returning to FIG. 7A, operation 706 depicts receiving a second instruction from the sending partition. However, prior to execution, system failure 708 might occur, resulting in the second instruction being erased from the receiving computing node's memory prior to being performed.

The recorded PID and LSN values depicted in FIG. 7B may be used in recovering from system failure 708, as seen in FIG. 7A. System failure may comprise various events that might require a restart of the receiving partition. Upon restarting, instructions previously contained in the receiving partitions receive buffer will have been erased.

Operation 710 in FIG. 7A depicts the beginning of the recovery process. In some cases, such as a power failure, recovery might begin once power has been restored and computing nodes hosting the partitions have rebooted. In some cases, a new master partition may have been selected, in which case the replication log may have been transported to the new master prior to beginning recovery.

At operation 712, the receiving partition may transmit a recovery request to obtain unexecuted instructions. For example, table 750 of FIG. 7B indicates association with two sending partitions that may have unprocessed instructions. The receiving partition may use the PID to identify the sending partition and send a request to it. For example, row 756 contains a PID value that might be used to determine the internet protocol ("IP") address of the sending partition. The values depicted in table 750 are illustrative, and could contain many different types of values.

The request may also include an LSN value. The LSN values originate with each partition and may, for example, increment by one with each generated instruction. Because the LSN values increase monotonically, they may be used to identify instructions that have not been processed. For example, row 756 contains an LSN value of 12. If the sending partition were to have instructions with LSN values greater than 12, it would indicate that those instructions have not been executed by the receiving partition. Accordingly, the sending partition may respond to the request by sending instructions for the receiving partition that have LSN values greater than the value included in the request. Instructions may be held in a log file associated with the sending partition.

Operation 714 in FIG. 7A depicts receiving and executing the instructions received as a result issuing the recovery request. The process may be repeated for each sending partition associated with the receiving partition.

Embodiments may act to ensure that instructions are executed in the same order that they are sent. For some embodiments, it may be sufficient to impose ordering at the sending partition level, which is to say that instructions are executed in the same order that they are sent. The sending partition may, for example, send instructions with higher LSN values only after it has sent instructions with lower LSN values.

Other embodiments may act to ensure that causally related instructions are executed in order. For example, consider the example embodiment depicted in FIG. 6. Receiving partition 604 may receive instructions from sending partition 600 as well as sending partition 602. A logical ordering to these events may be needed if these instructions resulted from the same event. For example, it may not be possible to update an index that refers to a table position if the table itself has not yet been modified. Embodiments may therefore employ techniques such as vector clocks, logical clocks, Lamport timestamps and so forth.

Figure 8:
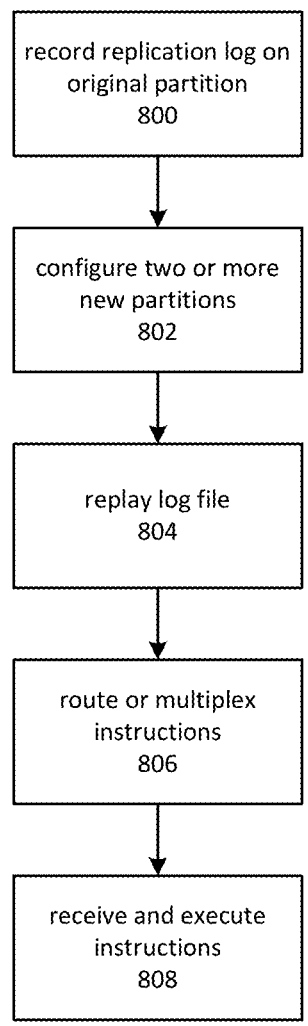
FIG. 8 is a flowchart depicting an embodiment for utilizing logged instructions to split a partition.

Embodiments may also employ aspects of the present disclosure to split partitions. FIG. 8 is one example of such an embodiment. Although depicted as a series of operations, those of ordinary skill in the art will appreciate that at least some of the depicted operations may be altered, omitted, reordered or performed in parallel.

A partition may be split into two or more partitions in order to better distribute storage requirements or workload demands. The new partitions may each contain a portion of the data held by the original partitions. Embodiments may identify split points within the data so that non-overlapping ranges of data may be placed on each partition. For example, items with primary key values beginning with the letters "A" through "M" could be stored on a first partition and "N" through "Z" on a second. The partitions might also distribute data randomly between the two partitions. For example, embodiments might apply hash functions to primary key values in order to determine which partition should store an item.

Operation 800 depicts recording a replication log during the routine operation of a partition. The replication log may contain a complete record of changes made to a partition and associated data structures, starting from an empty partition, or a partition pre-populated with data from a known starting point. At operation 802, two or more new partitions may be configured. The original partition may remain operational while the partitions are being split.

In some embodiments, the replication log may contain a record of changes made from a starting point that can be reconstructed on the new partitions. For example, files containing an initial set of data may be transferred from a storage device to the new partitions. The replication logs may then contain data reflecting changes made subsequent to this starting point. Various other means of initially populating the partitions may also be employed, such as using a virtual machine snapshot having a partition configured with the data at the starting point.

The replication log may be replayed so that instructions contained in the log are sent to the new partitions, as depicted by operation 804. Embodiments may utilize a send buffer for each of the new partitions. In order to reduce the number of instructions that need to be sent, some embodiments may merge instructions that are applicable to the same item. For example, the replication log may contain a sequence of instructions to modify values for a particular item. The end state of the item may be determined based on which values were affected by the updates and the order in which the updates occurred. Another example involves delete instructions. The replication log might contain a sequence of instructions including a number of updates to an item followed by a delete. In such a case, the entire sequence could be skipped, or only the delete sent.

Embodiments may also route or multiplex the replayed instructions to the new partitions, as depicted by operation 806. Routing instructions involve selecting one of the new partitions to receive an instruction based on the item it pertains to. For example, if the partitions are based on range, instructions pertaining to items with primary key values starting with "A" through "M" might be placed in a send buffer for a first partition, while "N" through "Z" items might be placed in a send buffer for transmittal to a second partition.

Multiplexing involves duplicating instructions for transmission to more than one destination partition. For reliability, a partition may be joined with one or more replication partners that maintain copies of the data on the partition. When a partition is split, the new partitions may each be joined with one or more replication partners. Instructions sent to the new partitions may be multiplexed so that the replication partners may be set up to contain the same data as the new partitions.

Operation 808 depicts the new partitions receiving and executing the instructions they each receive. Embodiments may filter out inapplicable instructions, particularly if the embodiment does not perform request routing as described above. After all of the instructions from the original partition's replication log have been sent and executed, the new partitions will, as a group, contain the same data that was managed by the original partition. If the original partition remained operational while the split process was underway, it may be inactivated and the new partitions might be activated.

The embodiment for failover recovery described in connection with FIGS. 7A and 7B may be employed to recover from failover events that might occur while splitting a partition. While processing incoming instructions, each of the new partitions may maintain a record of the last executed instruction. Upon system failure, information indicative of the last executed instruction may be transmitted to the original partition, which may resume replay of the instructions starting with the next instruction.

Access to a distributed DBMS may be provided to various client applications on behalf of the customers of a hosting company. To manage the workload caused by the client applications, and to help ensure that it is properly compensated for the services it provides, the hosting company may allocate a fixed or controlled amount of capacity to each customer. This capacity, which may be referred to as provisioned capacity, may be further allocated on a per-table or per-partition basis. Embodiments may, for example, use a token allocation and consumption technique to control capacity utilization on a partition. Tokens may be allocated to a partition at fixed or variable rate over some unit of time, and deducted when work is performed on the partition. If no tokens are available, a request to perform work on the partition may be rejected or deferred.

Figure 9:
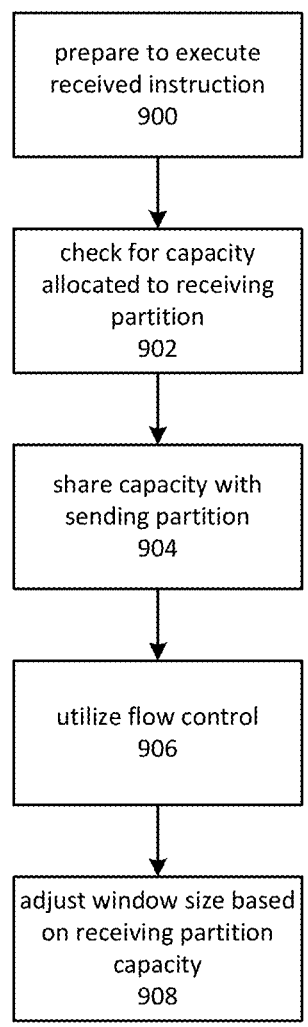
FIG. 9 is a flowchart depicting an embodiment for applying flow control to the transmission of instructions, based upon the capacity of the receiving partition to process the instructions.

Embodiments may impose limits on work performed by a receiving partition, including during normal operation, failover and subdividing a partition. FIG. 9 depicts an embodiment for applying provisioned capacity limitations. Although depicted as a sequence of operations, those of ordinary skill in the art will appreciate that at least some of the depicted operations may be altered, omitted, reordered or performed in parallel.

Operation 900 in FIG. 9 depicts preparing to execute a received instruction, which may include a capacity determination. For clarity, the following descriptions of the operations depicted in FIG. 9 explain capacity determination in terms of the token allocation and consumption scheme described above. However, numerous other methods may be employed.

At operation 902, the number of tokens in a pool of tokens associated with the receiving partition may be determined. If at least one token is available, the instruction may be processed and a token may be deducted from the pool. If a token is not available, other operations may be employed.

For example, operation 904 depicts sharing capacity with the sending partition. The sending partition may have a large pool of available tokens while the receiving partition has none remaining. One or more tokens may be transferred from the sending partition's pool of tokens to the receiving partition's pool, or more specifically tokens may be deducted from the sending partition's pool of tokens and added to the receiving partition's pool. This may be done proactively. Because the sending partition has access to the instructions that will be sent to the receiving partition, embodiments may use that access to calculate an estimate of the capacity that will be needed to process the request. The sending partition may therefore cause the receiving partition's pool of tokens to be enlarged and its own pool of tokens to be reduced. In other embodiments, the receiving partition may send a message to the sending partition requesting a transfer of tokens from the sending partition to the receiving partition.

Operation 906 depicts utilizing a flow control mechanism. Various embodiments may utilize sliding window techniques to control transmission of instructions between a send buffer and a receive buffer. In general terms, the sliding window technique involves a limit to the number of pending instructions that a receive buffer can accept. This is known as the window size. Once the window is full, the send buffer stops sending instructions until an instruction is removed from the receive buffer or the window size is increased.

The window size may be based on a variety of factors. Embodiments may base the initial window size on capacity allocated to the receiving partition, possibly including capacity that can be borrowed from the sending partition. The window size may also factor in the rate at which requests may be processed and an estimate of the capacity that would be consumed by processing an instruction. Other embodiments may initially set the window size to an arbitrary value.

The sending partition may send a number of instructions equal to the window size without receiving an acknowledgement. As instructions are processed, the receiving partition may send an acknowledgement after one or more instructions from the receive buffer have been processed. The receiving partition may also indicate that the window size should be increased or decreased, based upon factors such as the amount of capacity available to it at the time, the rate at which capacity is being used, the rate at which unprocessed instructions are accumulating in the receive buffer and so forth. Adjusting the window size is depicted by operation 908. The flow-control acknowledgement described here may be combined with other messages that the receiving partition transmits to the sending partition, including acknowledgement that an instruction has been processed.

Various other flow control mechanisms may be employed. Embodiments may, for example, allow the receive buffer to accommodate a large number of instructions relative to the capacity of the receiving partition to perform them. Capacity-based throttling may then be controlled by the receiving partition. The receiving partition may also ignore any instructions that it can't currently process due to capacity or due to the receive buffer being full. The receive buffer may recover by sending a message containing the LSN number of the last instruction that was successfully processed.

Embodiments of the present disclosure may be employed in conjunction with many types of DBMSs. A DBMS is a software and hardware system for maintaining an organized collection of data. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages such as structured query language ("SQL"), while others use APIs containing operations such as put and get and so forth. Interaction with the database may also be based on various protocols or standards, such as hypertext markup language ("HTML") and extended markup language ("XML"). A DBMS may comprise various architectural components, such as a storage engine that acts to store data one on or more storage devices such as solid-state drives.

DBMSs may divide collections of data, such as tables or items collections, into partitions. The term partition may be used to refer to a subset of a table or item collection. However, because partitions may be correspond on a one-to-one basis with computing nodes, the term partition may also be used to refer to a computing node that hosts a partition.

Figure 10:
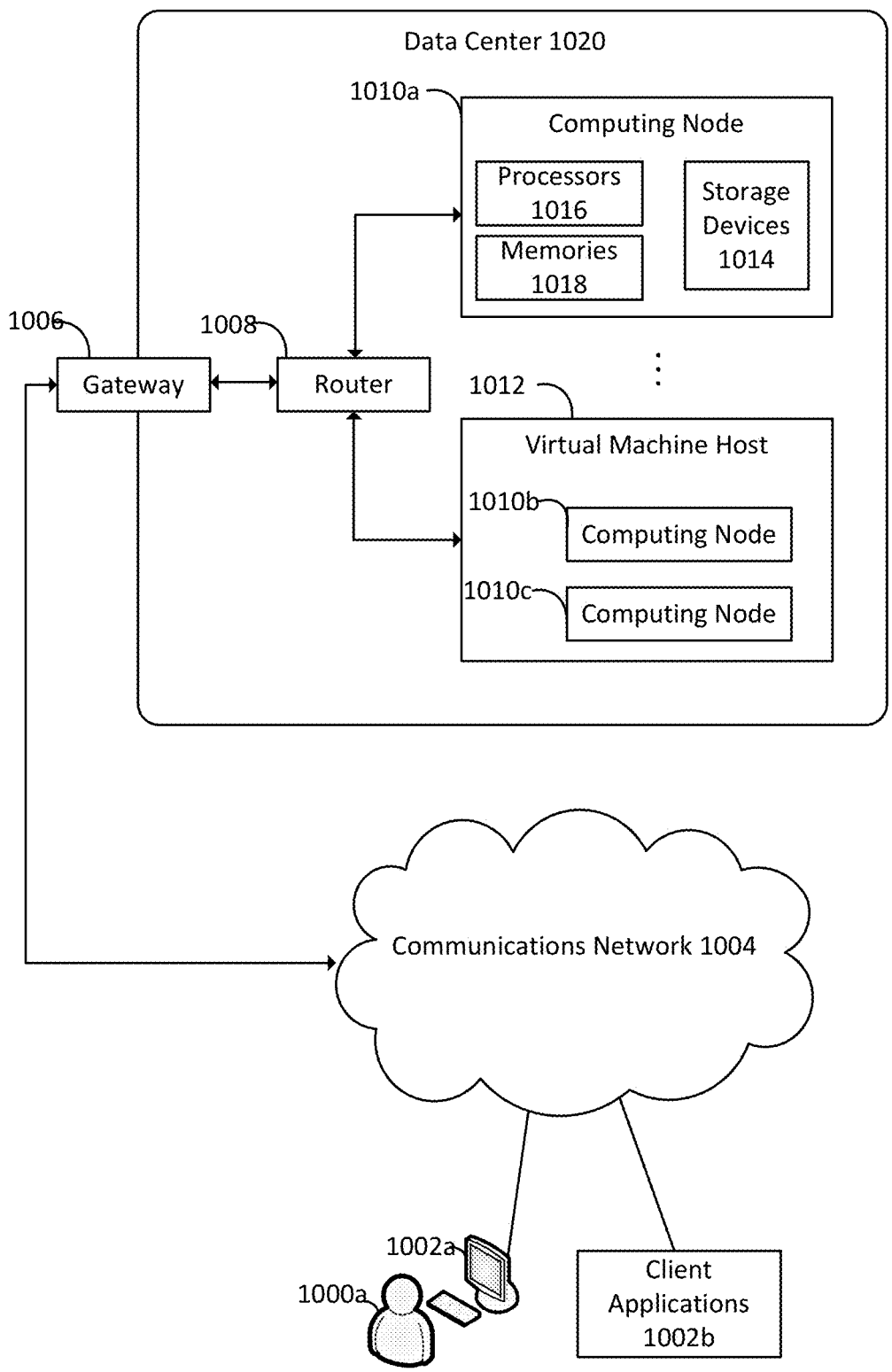
FIG. 10 is a block diagram depicting an embodiment of a computing environment in which aspects of the present disclosure may be practiced.

FIG. 10 is a diagram depicting an example of a distributed computing environment on which aspects of the present invention may be practiced. Various users 1000a may interact with various client applications, operating on any type of computing device 1002a, to communicate over communications network 1004 with processes executing on various computing nodes 1010a, 1010b and 1010c within a data center 1020. Alternatively, client applications 1002b may communicate without user intervention. Communications network 1004 may comprise any combination of communications technology, including the Internet, wired and wireless local area networks, fiber optic networks, satellite communications and so forth. Any number of networking protocols may be employed.

Communication with processes executing on the computing nodes 1010a, 1010b and 1010c, operating within data center 1020, may be provided via gateway 1006 and router 1008. Numerous other network configurations may also be employed. Although not explicitly depicted in FIG. 10, various authentication mechanisms, web service layers, business objects or other intermediate layers may be provided to mediate communication with the processes executing on computing nodes 1010a, 1010b and 1010c. Some of these intermediate layers may themselves comprise processes executing on one or more of the computing nodes. Computing nodes 1010a, 1010b and 1010c, and processes executing thereon, may also communicate with each other via router 1008. Alternatively, separate communication paths may be employed. In some embodiments, data center 1020 may be configured to communicate with additional data centers, such that the computing nodes and processes executing thereon may communicate with computing nodes and processes operating within other data centers.

Computing node 1010a is depicted as residing on physical hardware comprising one or more processors 1016, one or more memories 1018 and one or more storage devices 1014. Processes on computing node 1010a may execute in conjunction with an operating system or alternatively may execute as a bare-metal process that directly interacts with physical resources such as processors 1016, memories 1018 or storage devices 1014.

Computing nodes 1010b and 1010c are depicted as operating on virtual machine host 1012, which may provide shared access to various physical resources such as physical processors, memory and storage devices. Any number of virtualization mechanisms might be employed to host the computing nodes. Computing nodes 1010b and 1010c may comprise virtual memory, virtual processors and other virtualized representations of computing resources. Embodiments of the present disclosure may therefore comprise virtual processors and virtual memories configured to perform operations consistent with the techniques disclosed herein.

The various computing nodes depicted in FIG. 10 may be configured to host web services, database management systems, business objects, monitoring and diagnostic facilities and so forth. A computing node may refer to various types of computing resources, such as personal computers, servers, clustered computing devices and so forth. When implemented in hardware form, computing nodes are generally associated with one or more memories configured to store computer-readable instructions, and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments, and so forth. A virtualization-based computing node may have virtualized access to hardware resources, as well as non-virtualized access. The computing node may be configured to execute an operating system, as well as one or more application programs. In some embodiments, a computing node might also comprise bare-metal application programs.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A distributed database management system comprising:
a first computing node having stored thereon a log file and a first index of a plurality of indexes, the plurality of indexes comprising the first index and one or more replicas of the first index, the plurality of indexes comprising entries referring to a first collection of items stored in a partitioned table comprising a plurality of table partitions;
a second computing node having stored thereon a second index of the plurality of indexes, the second index a replica of the first index; and
non-transitory computer readable storage media having stored thereon computer readable instructions that, upon execution, cause the system at least to:
write, to the log file, an instruction describing one or more operations performed on the first index based on processing a first request to modify the first collection of items and determining an associated modification of the one or more entries in the first index that refer to items in the first collection of items stored in the partitioned table; and
send the instruction to the second computing node, based at least in part on a record of a last instruction received from the first computing node and processed by the second computing node on the second index, wherein the second computing node performs, based on the instruction, a second one or more operations on the second index corresponding to the first one or more operations performed on the first index.

2. The system of claim 1, further comprising non-transitory computer readable storage media having stored thereon computer readable instructions that, upon execution, cause the system at least to:
receive, by the first computing node, an acknowledgement from the second computing node, the acknowledgement based at least in part on performing the second operation.

3. The system of claim 1, further comprising non-transitory computer readable storage media having stored thereon computer readable instructions that, upon execution, cause the system at least to:
store the instruction in a memory of the second computing node; and
remove the instruction from the memory when the instruction is performed.

4. The distributed database management system of claim 1, wherein the instruction indicative of the first operation describes an update to the first index to reflect a modification of the first collection of items based on the first request, and wherein the second operation causes the second index to reflect a corresponding modification to a version of at least a subset of the first collection.

5. A computer-implemented method for storing and retrieving data, the method comprising:
recording, in a log file of a first computing node, information describing one or more first operations modifying a first index of a plurality of indexes, the plurality of indexes comprising the first index and one or more replicas of the first index, the plurality of indexes comprising entries referring to a first collection of items stored in a partitioned table, the one or more first operations associated with processing a first request to modify the first collection of items;
sending, by the first computing node, the information indicative of an instruction to a second computing node based at least in part on a record of a last instruction performed by the second computing node on a second index of the plurality of indexes, the second index a replica of the first index, wherein the second computing node performs, based on the instruction, a second one or more operations on the second index corresponding to the first one or more operations performed on the first index; and
returning, based on a quorum determination of the first and second computing nodes, a result of the first request to modify the first collection of items.

6. The method of claim 5, further comprising:
receiving, by the first computing node, an acknowledgement from the second computing node, the acknowledgement based at least in part on performing the second operation.

7. The method of claim 6, wherein the acknowledgement corresponds to an error condition.

8. The method of claim 6, further comprising:
upon receiving the acknowledgement, removing the information indicative of the instruction from a data structure in a memory of the first computing node.

9. The method of claim 5, further comprising:
locating one or more unacknowledged instructions in the log file.

10. The method of claim 9, further comprising:
performing steps comprising one or more of removing the instruction from the log file, marking the instruction as performed, and marking the instruction with an indication of an error condition.

11. The method of claim 5, wherein the last instruction performed was performed prior to a system failure.

12. The method of claim 5, further comprising sending, by the second computing node, a request to receive instructions from the first computing node, the request to receive instructions comprising the record of the last instruction performed by the second computing node.

13. The method of claim 5, further comprising storing the information indicative of the instruction in a memory of the second computing node.

14. The method of claim 13, further comprising removing the information indicative of the instruction from the memory of the second computing node upon performing the instruction.

15. The method of claim 5, further comprising receiving at the first computing node indicative of a maximum number of instructions to send before receiving an acknowledgement.

16. A non-transitory computer-readable storage medium having stored thereon instructions that, upon execution by a computing device, cause the computing device at least to:
receive, from a first computing node, an instruction describing a first operation modifying one or more entries in a first index of a plurality of indexes, the plurality of indexes comprising the first index and one or more replicas of the first index, the plurality of indexes comprising entries referring to a first collection of items stored in a partitioned table;
receive the instruction again if the computing device failed to modify a second index of the plurality of indexes, the second index a replica of the first index;
modify one or more entries in the second index by a second operation processed based at least in part on the instruction, the second operation on the second index corresponding to the first operation on the first index;
update a record of a last instruction performed on the computing device, the record comprising an indication of the first computing node; and
return, based on a quorum determination of the first and second computing nodes, a result of the first request to modify the first collection of items.

17. The computer-readable storage medium of claim 16, comprising further instructions that, upon execution by the computing device, cause the computing device at least to:
perform the second operation, wherein performing the operation is based at least in part on a first capacity indication associated with the first computing node and a second capacity indication associated with the second computing node.

18. The computer-readable storage medium of claim 16, comprising further instructions that, upon execution by the computing device, cause the computing device at least to:
send to the first computing node an indication of a maximum number of unacknowledged instructions that can be received by a second computing node.

19. The computer-readable storage medium of claim 18, wherein the maximum number is based at least in part on provisioned capacity.

20. The computer-readable storage medium of claim 16, wherein the record of a last instruction performed comprises information indicating that the first computing node sent the instruction.

21. The computer-readable storage medium of claim 16, wherein a version of at least a subset of the first collection of items comprises replicated data from the first collection of items.

22. A system for storing and retrieving data, the system comprising:
- a first computing node comprising a first memory and a first one or more storage devices, the first one or more storage devices having stored thereon a log file and a first index of a plurality of indexes, the plurality of indexes comprising the first index and one or more replicas of the first index, the plurality of indexes comprising entries referring to a first collection of items stored in a partitioned table;
- a second computing node comprising a second memory and a second one or more storage devices, the second one or more storage devices having stored thereon a second index of the plurality of indexes, the second index a replica of the first index;
- one or more processors configured to receive a request to change an item in the first collection of items;
- one or more processors configured to determine that the first index is modified by processing the request;
- one or more processors configured to determine one or more instructions describing one or more operations modifying the first index;
- one or more processors configured to update the first index on the first computing node, based at least in part on the one or more determined instructions; and
- one or more processors configured to update the second index on the second computing node, based at least in part on the one or more determined instructions, wherein the update to the second index corresponds to the update performed on the first index.

23. The system of claim 22, further comprising:
- one or more processors configured to store information indicative of the instruction in the first memory prior to sending the information indicative of the instruction to the second computing node;
- one or more processors configured to store the information indicative of the instruction in the second memory prior to updating the second index on the second computing node; and
- one or more processors configured to receive, at the first computing node, an acknowledgement indicative of the second index being updated.

24. The system of claim 22, wherein the first index corresponds to a collection of items and the second index corresponds to a version of at least a subset of the collection of items.

25. The system of claim 22, wherein the first index corresponds to a first subset of a collection of items and the second index corresponds to a second subset of the collection of items.

26. The system of claim 22, further comprising:
- one or more processors configured to store the one or more instructions in a log file; and
- one or more processors configured to perform steps comprising one or more of removing the one or more instructions from the log file, marking the one or more instructions as completed, and marking the one or more instructions as unacknowledged.

\* \* \* \* \*